June 25, 1963

H. R. CHOPE 3,095,254

INDICATING AND RECORDING DEVICE

Filed July 28, 1961

TO MARKING INDICATOR

INVENTOR
Henry R. Chope
By Anthony D. Cennamo ical and chemical variables. Various types of recorders have been developed for such uses. One such recorder is the so-called self-balancing potentiometer recorder. This recorder indicates and records on either a strip or circular chart the time variation of a given input variable or voltage. The self-balancing potentiometer measures an unknown voltage, $e_x$, or some physical variable translatable into a unknown voltage by automatically feeding back a voltage equal in magnitude to the unknown voltage. This equal voltage is obtained by automatically moving a contact or arm across a potentiometer until the feedback voltage is equal to the unknown voltage. There is physically coupled to the moving arm of the potentiometer or slide wire a pointer whose position against a graduated scale reflects the value of the unknown voltage or variable. The feedback voltage across the slide wire is made equal in magnitude to the unknown voltage by comparing the two voltages and converting their differences to an A.C. signal. The A.C. signal is amplified by a servo amplifier which in turn drives a motor which repositions the slide wire center arm to a point of null balance. At the point of null balance, the unknown voltage is equal to the feedback voltage. Although such recorders have found wide usage, they suffered from the limitation that the slide wire will wear after much repeated movement of its center arm. Such wear with time causes the slide wire to totally fail or else change its resistance and hence voltage linearity with respect to movement of the center arm.

More recently strain gauge elements have been substituted in these self-balancing recorders. Strain gauge elements are thin metallic filaments whose resistances change as the filament is elongated or strained. In one embodiment of the self-balancing feedback recorder, four strain elements are incorporated as legs of a Wheatstone bridge. The self-balancing motor causes the two opposite legs of the Wheatstone bridge to be strained in one direction while the other two opposite legs are slightly compressed. Hence, the resistance of two legs of the Wheatstone bridge increases whereas the resistance of the two opposite legs decreases. The unbalanced voltage across the Wheatstone bridge is compared to the unknown voltage. The difference between the unknown voltage and the voltage across the bridge is converted to an A.C. voltage which is amplified by a servo amplifier and fed to a servo balancing motor. The servo balancing motor is coupled through shafts and a system of levers to the four strain elements in the balancing bridge. Such self-balancing recording apparatus does eliminate slide wire difficulties associated with self-balancing potentiometer recorders. However, the voltage range of unknown voltages that can be measured is somewhat limited due to the small dimensional changes permissible in the strain elements. It has also been noted that temperature changes normally found in industrial environments may cause considerable shifting in mechanical alignments and thus yield errors in balance position and indicated voltage.

The present invention described herein utilizes a solid state feedback element comprising a crystal of piezoelectric material or a transistor to which a force is applied in accordance with the position of a servo balancing motor. As a result of the variable strain developed in the crystal by the variable force applied, the crystal develops or controls the magnitude of the variable feedback voltage in the servo system.

Piezoelectric crystals, particularly of the ceramic type, whose characteristics are well known, may be employed in the practice of the invention when used in combination with a suitable impedance matching device. A more sophisticated arrangement of the invention utilizes the well-known pressure dependence of the mobility of electrons and holes in semiconductors. The theoretical analysis of this phenomenon is explained in the text by W. Shockley, Electrons and Holes in Semiconductors, Van Nostrand, 1950, Section 12.8.

In recent years the semiconductors have been utilized in transistors. Germanium and silicon have been conventionally used. It has been found that germanium transistors are limited to temperature regions below 100° C. Silicon transistors will operate at higher temperatures. However, they too have a maximum temperature limit. Gallium arsenide transistors and solid state electrical elements have been built for operation in higher temperature regions. As is well known now in the art, solid state electrical elements show a temperature coefficient for their various operating parameters. In circuits utilizing solid state elements it is necessary to either temperature stabilize these elements or to provide proper circuit compensation for changes in their characteristics with temperature. The gallium arsenide transistor and the gallium arsenide diode, as well as the semiconductor elements discussed by Shockley, have characteristics such that when a deforming force is applied, there is a substantial change in the current through the gallium arsenide element. By constructing a gallium arsenide element in essentially the form of a transistor with base, collector, and emitter elements, it was found that when very stable potentials were applied to two elements of the transistor and the over-all body of the transistor held at a constant temperature, the current output from the third element varied with small elongations or strains applied to its surface. Accordingly, this gallium arsenide element has been utilized as the feedback element in an improved self-balancing recorder.

Accordingly, it is a primary object of the present invention to provide a self-balancing indicator-recorder which eliminates both the self-balancing slide wire and self-balancing strain elements.

A further object of the present invention is to provide a self-balancing recorder with a gallium arsenide feedback element whose operation and indication are independent of temperature variations found in industrial plants.

A still further object of the present invention is to provide a self-balancing indicator-recorder suitable for operation in extremely high environmental temperatures.

These and other objects and advantages of the present invention will become apparent from the following detailed description when taken in connection with the accompanying drawings in which.

Figure 1:
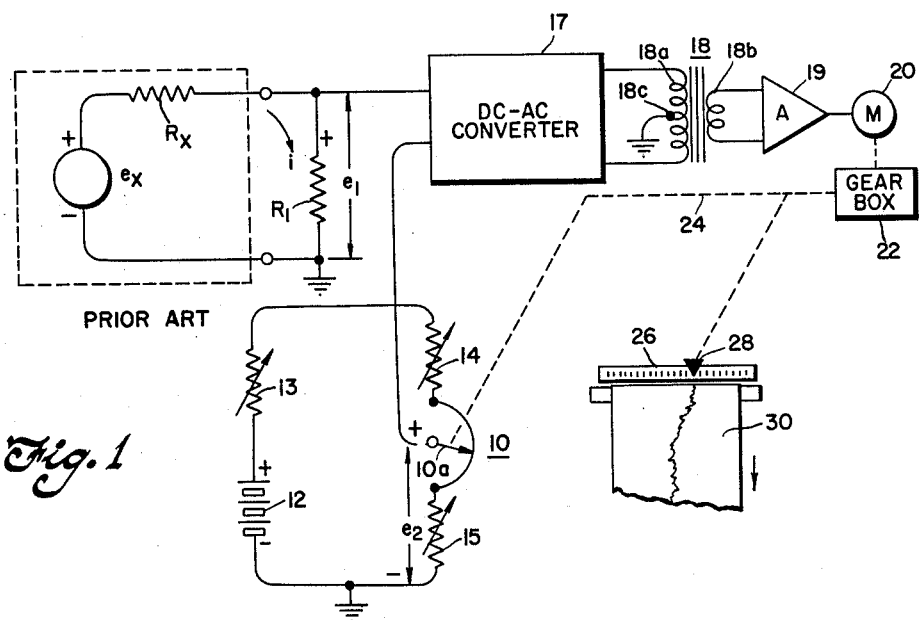
FIG. 1 is a simplified view showing a conventional self-balancing potentiometer recorder.

Referring now to FIG. 1, voltage $e_x$ is the unknown voltage to be measured and recorded. $R_x$ represents the internal impedance of the voltage source. The voltage $e_x$ causes a current $i$ to flow through resistor R and cause a voltage $e_1$ to appear across resistor $R_1$. Across the slidewire 10 is a voltage determined by reference voltage source 12 and resistors 13, 14, 15, as well as the slidewire resistance. Movements of the slidewire arm 10a back and forth provide a voltage $e_2$. The voltages $e_1$ and $e_2$ are connected in a bucking circuit arrangement whereby differences in voltage $e_1$ and the feedback voltage $e_2$ are applied to a mechanical D.C. to A.C. converter 17. Converter 17 alternates the flow of D.C. current through the primary 18a of transformer 18 to the primary center tap 18c. The output from the secondary 18b of transformer 18 is connected to a servo amplifier 19. The power output of servo amplifier 19 energizes a two-phase servomotor 20 which when connected to slidewire arm 10a through proper gearing 22 and linkage as at 24 causes the voltage $e_2$ to be equal in magnitude to voltage $e_1$ developed across resistor $R_1$. The position of the slidewire arm 10a is reflected on a scale 26 by pointer 28 to indicate the value of the unknown voltage $e_x$. A pen may be attached to the pointer 28, and its movement back and forth along a driven chart 30 will yield a time record of the unknown voltage $e_x$. Resistors 13, 14, and 15 are adjustable and determine the voltage range across slidewire 10.

Figure 2:
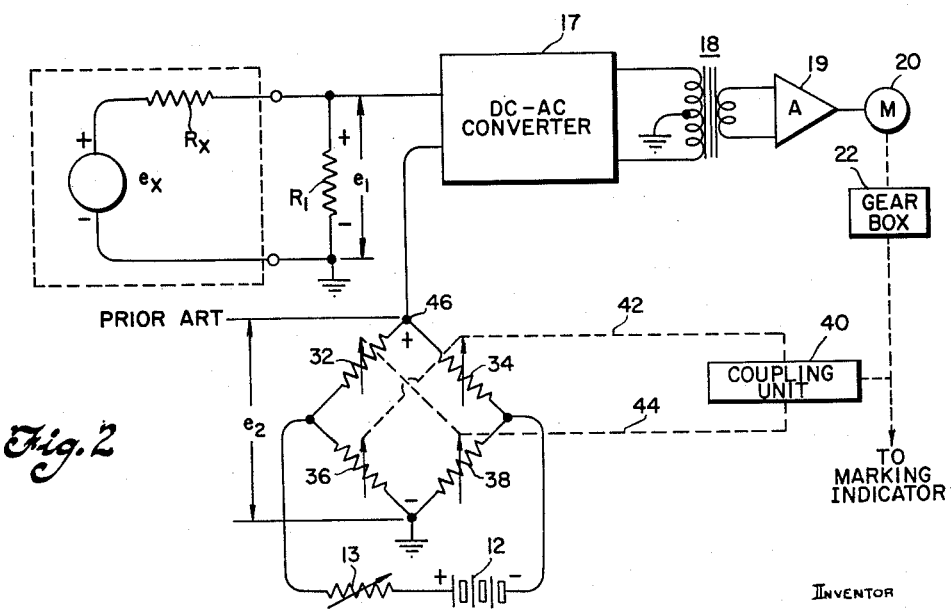
FIG. 2 is a simplified diagram showing another self-balancing recorder utilizing a strain gauge bridge arrangement.

Referring to FIG. 2, the feedback voltage $e_2$ is provided in one system by disturbing the ratio arms of a bridge network constructed of resistive strain gauges 32—38. A mechanical coupling unit 40 is driven by the servomotor 20 and gear box 22. Mechanical linkages represented by the dotted lines 42, 44 extend to each of the strain gauges and are constructed to compress one pair of opposite elements of the bridge while elongating the other pair. The dimensional change in the strain gauge element is reflected in its electrical resistance. The mechanical gauge element is reflected in its electrical resistance. The mechanical coupling is selectively applied with a given bridge polarization to insure a positive-going potential at terminal 46 with respect to ground.

The small dynamic range of this feedback arrangement and the inherent difficulties of mechanical alignment render this device not altogether useful in all industrial environments. And the deleterious effect of temperature upon the strain gauge elements may result in inaccurate or entirely misleading recorded indications of a process variable.

Figure 3:
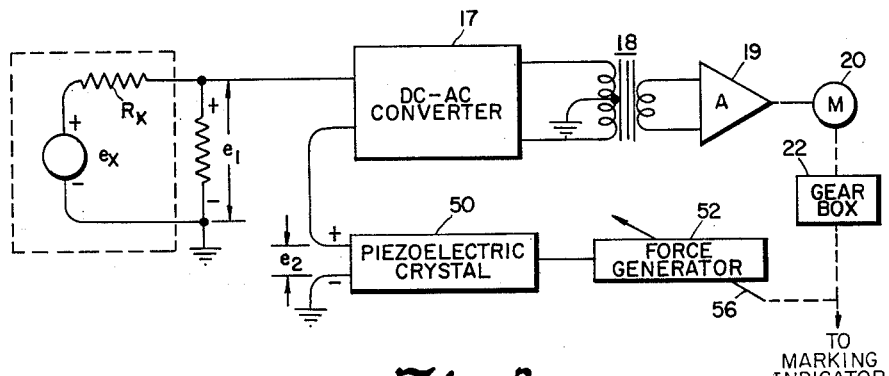
FIG. 3 is a diagrammatic view of an improved self-balancing recorder constructed in accordance with the present invention.
Figure 4:
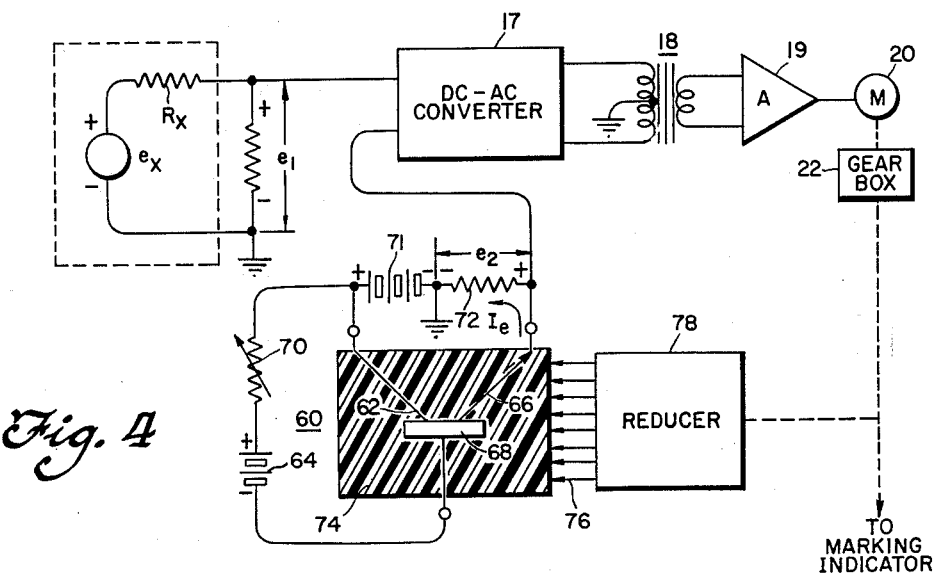
FIG. 4 is a sectional view partly diagrammatic of the novel feedback circuit utilized in the recorder shown in FIG. 3.

With reference now to FIGS. 3 and 4, the present invention provides a feedback potential $e_2$ generated by a piezoelectric crystal element 50 subjected to the output of an external force generator 52. Force generator 52 is adjusted at 56 by the servomotor 20 through the gear box 22. Alternatively, other electromechanical expedients other than the servo amplifier and servomotor may be utilized. The substance used at 50 may be quartz, tourmaline or other synthetic or semi-conductor substance. Piezoelectric ceramics and poled ferroelectric ceramics such as barium titanate may also be used at 50. Under the application of a force of, e.g., 50 milligrams, provided by the generator 52 to opposite faces of the crystal 50, a potential is developed across the crystal which is proportional to the magnitude of the deforming force. In the case of a quartz crystal, a mechanical stress induced along the characteristic Y axis thereof will cause electrical charges to appear on the faces of the crystal that are perpendicular to the X axis, the two axes being mutually perpendicular to the Z axis of the crystal.

Since the impedance of the crystal 50 is usually quite high except at one or more antiresonant frequencies, the low impedance input of the converter 17 may load the element unless a suitable impedance matching device is provided. In FIG. 4 this difficulty is overcome by utilizing a solid state device such as a transistor 60. The elements of transistor 60 are connected in a common collector circuit configuration. The collector element 62 is connected to one terminal of a constant voltage supply represented by the battery 64. The emitter 66 is connected to converter 17 and the base 68 is connected to the battery 64 through a resistor 70. A battery 71 provides the required collector-to-emitter bias. The emitter current $I_e$ flows through a resistance 72 to provide a positive-going potential $e_2$ with respect to ground which is coupled into the converter 17. With this connection the transistor presents a high impedance to the battery 64 and a low impedance to the converter 17. Although the circuit is shown for an n-p-n transistor, the modifications necessary to utilize a p-n-p type will be apparent to those skilled in the art.

The transistor 60 is typically encapsulated by a plastic material 74 to prevent moisture reaching the element junctions. It has been found that the characteristics of a gallium arsenide varactor can be altered by imposing a stress upon the transistor assembly as indicated at 76. This could be provided by a mechanical or hydraulic piston-and-cylinder or rack gear arrangements coupled to a gear reducer unit 78. Gear reducer 78 is in turn driven by the servomotor 20. It has also been found that point contact transistors are extremely sensitive to an incremental deforming force while junction transistors are not nearly so critical. In using the point-contact type, care must be taken to restrict the maximum stress induced to insure against complete collapse of transistor action.

Figure 5:
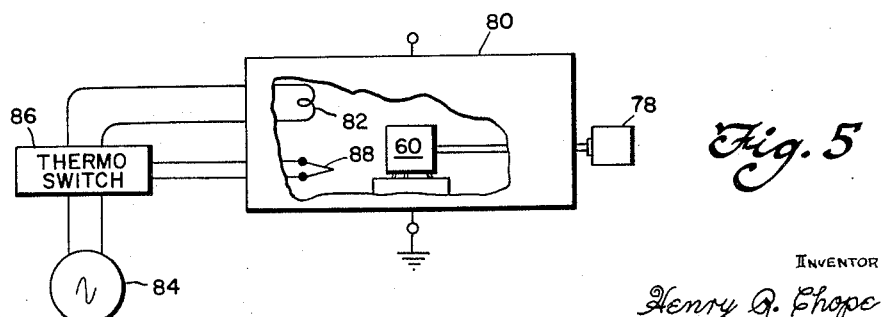
FIG. 5 is a diagrammatic view showing apparatus for compensating the recorder of FIG. 3 for changes in environmental temperature.

Referring to FIG. 5 it may be desirable to provide a temperature-stabilized environment for the transistor 60 and associated circuitry. To this end a thermally insulated unit 80 having an interior heated by an element 82 is connected to a power supply 84 through a thermoswitch 86. The state of switch 86 is controlled by a temperature sensitive thermostat 88 mounted in the interior of unit 80. Therefore with the operating temperature of the transistor stabilized, its characteristics are a function only of the deforming stress exerted by the servomotor 20.

Although certain and specific embodiments have been shown, modifications may be made thereto without departing from the true spirit and scope of the invention.

I claim:
1. In a self-balancing electrical instrument for indicating the value of a signal having an unknown magnitude, said instrument having means for comparing said signal with a reference signal and means including motor means responsive to said comparing means for moving a mechanical element in a direction dependent on the difference in magnitude between said unknown signal and said reference signal, the improvement comprising means including a solid state crystal element receiving a variable stress according to the movement of said mechanical element for generating said reference signal.

2. A self-balancing indicator-recorder for an unknown signal comprising a solid state element providing an electrical signal to null out or balance said unknown signal, a circuit for comparing said unknown signal with said electrical signal, a converter for converting any differences between said two signals to an A.C. signal, a two-phase motor, a servo power amplifier for amplifying said A.C. signal to a power level sufficient to drive said two-phase motor, and means for mechanically coupling said motor to said solid state element to apply a small displacement to the surface of said solid state element.

3. A self-balancing indicator-recorder for an unknown signal comprising a solid state element providing an electrical signal to null out or balance said unknown signal, a circuit for comparing said unknown signal with said electrical signal, a converter for converting any differences between said two signals to an A.C. signal, a two-phase motor, a servo power amplifier for amplifying said A.C. signal to a power level sufficient to drive said two-phase motor, means for mechanically coupling said motor to said solid state element to apply a small displacement to the surface of said solid state element, a pointer, and means for coupling said pointer to said motor to indicate the value of said unknown voltage.

4. A recorder as in claim 3 in which said solid state element comprises a gallium arsenide substance.

5. An indicator-recorder for measurement of an unknown voltage or variable translatable into said voltage comprising a temperature stabilized gallium arsenide varactor for providing an electrical voltage proportional to the stress exerted on said varactor utilized as a feedback element, a converter for converting any differences between said voltages to an A.C. signal, a servo amplifier, a self-balancing motor, a piston connected to said varactor, gearing between said self-balancing motor and said piston to apply a stress to said varactor, a pointer coupled to said self-balancing motor, and a scale against which said pointer is referred to indicate or record the value of said unknown voltage or variable.

6. In a self-balancing recorder receiving an input signal of unknown magnitude, a converter for providing an A.C. voltage proportional to any difference between said input signal and a feedback signal, a two-phase servomotor connected to said converter, gearing means connected to said servomotor, a piezoelectric substance, and means coupling said gearing means to said piezoelectric substance whereby said substance provides said feedback signal with a magnitude proportional to the rotational displacement of said motor.

7. In a self-balancing recorder receiving an input signal of unknown magnitude, and having a converter for providing an A.C. voltage proportional to any differences in said input signal and a feedback signal, a two-phase servomotor connected to said converter, and gearing means connected to said servomotor the improvement comprising a transistor, circuit means for connecting said transistor in a common collector configuration having an input and an output providing said feedback signal, means for connecting a D.C. supply across said input, means for connecting said output to said converter, means coupling said gearing means to said transistor so as to apply a variable bodily stress thereto, whereby said output is adjusted to a magnitude proportional to the rotational displacement of said motor.

References Cited in the file of this patent
UNITED STATES PATENTS

| | | |
|---|---|---|
| 2,925,544 | Lang | Feb. 16, 1960 |
| 2,957,115 | Clark et al. | Oct. 18, 1960 |